(12) United States Patent
Yoshida et al.

(10) Patent No.: US 11,596,975 B2
(45) Date of Patent: Mar. 7, 2023

(54) WATER REPELLENT COATING FILM AND PRODUCT PROVIDED WITH SAME

(71) Applicant: MITSUBISHI ELECTRIC CORPORATION, Chiyoda-ku (JP)

(72) Inventors: Yasuhiro Yoshida, Chiyoda-ku (JP); Yoshinori Yamamoto, Chiyoda-ku (JP); Tasuku Izutani, Chiyoda-ku (JP); Natsumi Kubota, Chiyoda-ku (JP); Shigeru Utsumi, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 667 days.

(21) Appl. No.: 16/475,841

(22) PCT Filed: Feb. 14, 2017

(86) PCT No.: PCT/JP2017/005295
§ 371 (c)(1),
(2) Date: Jul. 3, 2019

(87) PCT Pub. No.: WO2018/150455
PCT Pub. Date: Aug. 23, 2018

(65) Prior Publication Data
US 2019/0351450 A1    Nov. 21, 2019

(51) Int. Cl.
*B05D 5/08* (2006.01)
*B05D 7/00* (2006.01)
*C09D 175/04* (2006.01)
*C08K 3/013* (2018.01)
*C08K 3/36* (2006.01)
*C08K 7/18* (2006.01)
*C09D 127/12* (2006.01)

(52) U.S. Cl.
CPC ............... *B05D 5/08* (2013.01); *B05D 7/52* (2013.01); *C08K 3/013* (2018.01); *C08K 3/36* (2013.01); *C08K 7/18* (2013.01); *C09D 127/12* (2013.01); *C09D 175/04* (2013.01); *B05D 2201/02* (2013.01); *B05D 2202/15* (2013.01); *B05D 2202/25* (2013.01); *B05D 2203/35* (2013.01); *B05D 2503/00* (2013.01); *B05D 2506/10* (2013.01); *B05D 2518/10* (2013.01); *B05D 2601/22* (2013.01); *C08K 2201/003* (2013.01)

(58) Field of Classification Search
None
See application file for complete search history.

(56) References Cited

FOREIGN PATENT DOCUMENTS

| JP | 7-268245 | A | 10/1995 |
|---|---|---|---|
| JP | 8-157643 | A | 10/1995 |
| JP | 8-323285 | A | 12/1996 |
| JP | 2003-147340 | A | 5/2003 |
| JP | 2009-12238 | A | 1/2009 |
| JP | 2010-155727 | A | 7/2010 |
| JP | 2011-83689 | A | 4/2011 |
| JP | 2012-20248 | A | 2/2012 |
| JP | 2016-2706 | A | 2/2012 |
| JP | 2012020248 | A * | 2/2012 |
| JP | 2013-123660 | A | 6/2013 |
| JP | 2015-209493 | A | 11/2015 |
| WO | WO 2010/073623 | A1 | 7/2010 |

OTHER PUBLICATIONS

International Search Report dated Apr. 4, 2017 in PCT/JP2017/005295 filed Feb. 14, 2017.

* cited by examiner

Primary Examiner — Cheng Yuan Huang
(74) Attorney, Agent, or Firm — Xsensus LLP

(57) ABSTRACT

Provided is a water repellent coating film, including: an undercoat layer formed on a surface of a base material and containing: at least one type of spherical particles having an average particle diameter of 2 μm or more and 50 μm or less and selected from the group consisting of spherical molten silica particles, spherical molten alumina particles, and spherical silicone resin particles; and an underlying resin; and a topcoat layer formed on the undercoat layer and containing: inorganic fine particles having an average particle diameter of 2 nm or more and 20 nm or less; and a water repellent resin. The underlying resin is preferably a polyurethane resin or a fluororesin. The water repellent resin is preferably a fluororesin or a silicone resin.

5 Claims, 4 Drawing Sheets

WATER REPELLENT COATING FILM AND PRODUCT PROVIDED WITH SAME

TECHNICAL FIELD

The present invention relates to a water repellent coating film and a product having formed thereon the same.

BACKGROUND ART

As a method of forming a water repellent surface having a fine uneven structure, for example, there have been proposed a method involving mechanically processing or etching a surface of a base material, and a method involving applying a coating composition containing fine particles or a fine particle precursor and a resin to a surface of a base material.

Of those methods, a method using a coating composition can impart water repellency to base materials having various shapes simply by applying a resin solution thereto, and hence is advantageous in terms of productivity and production cost. Specific examples of such method include: a method involving applying, to a base material, a super water repellent agent containing hydrophobized silica fine particles and a hydrophobic resin, such as a fluorine-containing resin, in such amounts that their weight ratios after volatilization are from 30% to 100% and from 0% to 70%, respectively, the silica fine particles being dispersed in an organic solvent by ultrasonic irradiation, and then curing the super water repellent agent, to thereby form a super water repellent coating film (see Patent Document 1); a method involving forming a surface-roughened coating film on a surface of a metal plate through use of an organic coating material having added thereto fine particles, and then forming a water repellent coating film on the surface-roughened coating film (see Patent Document 2); and a method involving forming an underlying coating film on a surface of a metal material through use of a coating material containing hydrophilic fine particles and an organic resin, and then forming a finish coating film on the underlying coating film through use of a coating material containing a fluorine-based resin or a silicone-based resin as a main component (see Patent Document 3).

CITATION LIST

Patent Document

Patent Document 1: Japanese Patent Application Laid-Open No. 2003-147340
Patent Document 2: Japanese Patent Application Laid-Open No. H8-323285
Patent Document 3: Japanese Patent Application Laid-Open No. 2011-083689

SUMMARY OF INVENTION

Technical Problem

However, the water repellent coating film as described in Patent Document 1 has the following problem: the coating film itself is liable to be broken or peeled off, and hence its water repellency is easily lost. In addition, the water repellent coating film having a two-layer structure as described in each of Patent Documents 2 and 3 has the following problem: wear of not only the outermost layer having water repellency but also the underlying layer progresses owing to friction or the like to cause peeling of the outermost layer, and hence the water repellency is easily lost.

The present invention has been made in order to solve such problems as described above, and an object of the present invention is to provide a water repellent coating film that hardly undergoes a reduction in water repellency even when its surface is worn by friction or the like.

Solution to Problem

According to one embodiment of the present invention, there is provided a water repellent coating film, including: an undercoat layer formed on a surface of a base material and containing: at least one type of spherical particles having an average particle diameter of 2 μm or more and 50 μm or less and selected from the group consisting of spherical molten silica particles, spherical molten alumina particles, and spherical silicone resin particles; and an underlying resin; and a topcoat layer formed on the undercoat layer and containing: inorganic fine particles having an average particle diameter of 2 nm or more and 20 nm or less; and a water repellent resin.

Advantageous Effects of Invention

According to the present invention, the water repellent coating film, which hardly undergoes a reduction in water repellency even when its surface is worn by friction or the like, can be provided.

DESCRIPTION OF EMBODIMENTS

First Embodiment

Figure 1:
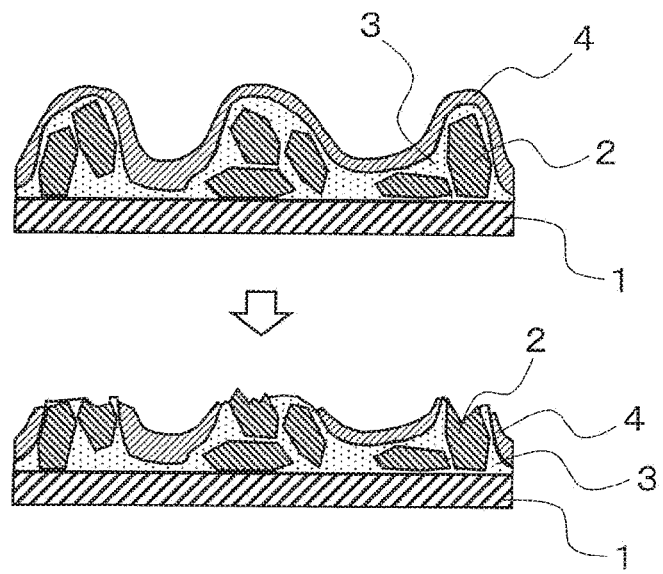
FIG. 1 is a schematic cross-sectional view for illustrating states of a related-art water repellent coating film before and after wear.

FIG. 1 is a schematic cross-sectional view for illustrating states of a related-art water repellent coating film before and after wear, the related-art water repellent coating film being formed on the surface of a base material 1, and including: an underlying layer containing amorphous particles 2 each formed of an inorganic substance, such as silica, and an underlying resin 3; and a water repellent layer formed so as to cover the underlying layer, and formed of a water repellent resin 4. The underlying layer has unevenness formed on its surface by the amorphous particles 2, and with the unevenness, unevenness is also formed on the surface of the water repellent layer. As a result of the water repellent layer being formed on the underlying layer having unevenness, breakage and peeling of the water repellent layer are suppressed.

When the surface of such water repellent coating film is subjected to friction, the water repellent layer formed on the projections of the underlying layer is worn, but the water repellent layer formed on the recesses of the underlying layer is hardly worn. When the wear progresses through repeated friction, as illustrated in the lower part of FIG. 1, the underlying resin 3 is worn and part of the amorphous particles 2 are broken or chipped, resulting in a state in which a hydrophilic surface is exposed. Under such state, water repellency is lost, and water droplets adhere to the surface.

Figure 2:
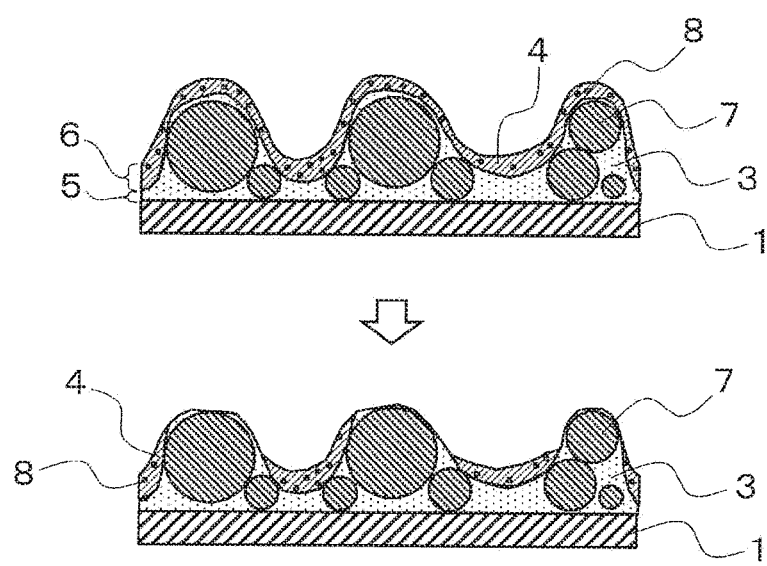
FIG. 2 is a schematic cross-sectional view for illustrating states of a water repellent coating film according to a first embodiment of the present invention before and after wear.

FIG. 2 is a schematic cross-sectional view for illustrating states of a water repellent coating film according to a first embodiment of the present invention before and after wear. The water repellent coating film according to the first embodiment includes an undercoat layer 5 formed on the surface of the base material 1, and a topcoat layer 6 formed so as to cover the undercoat layer 5. The undercoat layer 5 contains spherical particles 7 having an average particle diameter of 2 μm or more and 50 μm or less and the underlying resin 3. The spherical particles 7 are spherical molten silica particles, spherical molten alumina particles, spherical silicone resin particles, or a mixture thereof. The topcoat layer 6 contains inorganic fine particles 8 having an average particle diameter of 2 nm or more and 20 nm or less and the water repellent resin 4. Unevenness is formed on the surface of the undercoat layer 5 by the spherical particles 7, and with the unevenness, unevenness is also formed on the surface of the topcoat layer 6.

When the surface of the water repellent coating film according to the first embodiment is subjected to friction, the topcoat layer 6 formed on the projections of the undercoat layer 5 is worn, but the topcoat layer 6 formed on the recesses of the undercoat layer 5 is hardly worn. When the wear progresses through repeated friction, the underlying resin 3 is worn, resulting in a state in which the spherical particles 7 are partially exposed, but further wear hardly progresses. There is a tendency that fine water droplets are liable to adhere to the vicinity of where the spherical particles 7 are exposed. However, water repellency is maintained. The reasons for this are as follows: the spherical molten silica particles and the spherical molten alumina particles serving as the spherical particles 7 have high surface smoothness, are dense, and have high hardness, and hence are excellent in wear resistance; and the spherical silicone particles serving as the spherical particles 7 have high surface smoothness, and are hardly broken even when friction is repeated. In addition, the spherical silicone particles serving as the spherical particles 7 are excellent in water repellency, and hence surfaces to be exposed after wear also have water repellency. Accordingly, water repellency is likely to be maintained. As compared to the spherical molten silica particles and the spherical molten alumina particles, the spherical silicone particles serving as the spherical particles 7 have a disadvantage of being liable to be worn by friction mediated by a high-hardness substance, such as dust, but have advantages such as a pleasant feel at the time of rubbing by a hand, and small frictional resistance at the time of friction.

The average particle diameter of the spherical particles 7 is 2 μm or more and 50 μm or less, preferably 4 μm or more and 20 μm or less. When the average particle diameter of the spherical particles 7 is less than 2 μm, the unevenness of the undercoat layer 5 becomes so small that a protective effect on the topcoat layer 6 is not obtained at the time of friction. Meanwhile, when the average particle diameter of the spherical particles 7 is more than 50 μm, the unevenness of the undercoat layer 5 is so large that a problem such as filling of the recesses of the topcoat layer 6 with foreign matter occurs, with the result that performance as a water repellent coating film cannot be exhibited. Herein, the average particle diameter of the spherical particles 7 refers to a value measured with a laser diffraction particle diameter measurement apparatus.

It is preferred to use, as the spherical particles 7, ones obtained by subjecting the surfaces of spherical molten silica particles and spherical molten alumina particles to hydrophobizing treatment with a silylating agent, a silane coupling agent, or the like. The use of the spherical molten silica particles and the spherical molten alumina particles subjected to the hydrophobizing treatment can enhance the water repellency of the surfaces to be exposed at the time of wear, and thus can enhance a water repellency-maintaining effect. In particular, the hydrophobizing treatment is effective for the spherical molten silica particles.

Examples of the underlying resin 3 include: a polyurethane resin, a fluororesin, a silicone resin, various polyolefins, such as polypropylene and polyethylene, polyvinyl chloride, an acrylic resin, a methacrylic resin, polystyrene, an ABS resin, and an AS resin. Those resins may be used alone or in combination thereof. Of those, a polyurethane resin is preferred because of being excellent in wear resistance. In addition, a fluororesin and a silicone resin are preferred because of being excellent in water repellency. In order to improve adhesiveness between the underlying resin 3 and the base material 1, a resin having introduced therein a substituent or the like may be used.

A volume ratio between the underlying resin 3 and the spherical particles 7 in the undercoat layer 5 falls within preferably the range of from 5:95 to 90:10, more preferably the range of from 20:80 to 80:20. When the volume ratio of the spherical particles 7 is excessively small, a sufficient number of projections and recesses are not formed on the surface of the undercoat layer 5 in some cases. Meanwhile, when the volume ratio of the spherical particles 7 is excessively large, the undercoat layer 5 having sufficient strength is not obtained in some cases.

The undercoat layer 5 may be formed by applying, to the base material 1, a coating composition for undercoat layer formation containing the underlying resin 3, the spherical particles 7, and a solvent capable of dissolving or emulsifying the underlying resin. The total amount of the underlying resin 3 and the spherical particles 7 is preferably 3 mass % or more and 40 mass % or less with respect to the coating composition for undercoat layer formation. When the total amount of the underlying resin 3 and the spherical particles 7 is less than 3 mass %, the spherical particles 7 are liable to settle out to reduce the handleability of the coating composition, and moreover, the spherical particles 7 cannot be stably fixed in the undercoat layer 5 in some cases. Meanwhile, when the total amount of the underlying resin 3 and the spherical particles 7 is more than 40 mass %, it is difficult to uniformly form the undercoat layer 5 in some cases. A crosslinking agent may be added to the coating composition for undercoat layer formation in order to improve the strength of the underlying resin 3. In addition, a known additive may be added to the coating composition for undercoat layer formation in order to improve applicability or improve the water repellency of the underlying resin 3.

The application of the coating composition for undercoat layer formation may be performed by spray application, brush application, roller brush application, or the like. The thickness of the undercoat layer 5 is preferably ⅓ times or more and 5 times or less as large as the average particle diameter of the spherical particles 7 in terms of average thickness. When the thickness of the undercoat layer 5 is less than ⅓ times as large as the average particle diameter of the spherical particles 7, sufficient wear resistance is not obtained in some cases. Meanwhile, when the thickness of the undercoat layer 5 is more than 5 times as large as the average particle diameter of the spherical particles 7, the strength of the undercoat layer 5 is reduced, or the external appearance of the water repellent coating film is degraded in some cases.

Examples of the inorganic fine particles 8 include, but not particularly limited to, silica, alumina, zirconia, and titania. The surfaces of those inorganic fine particles are generally hydrophilic, and hence ones whose surfaces have been subjected to hydrophobizing treatment are preferably used. As a method for the hydrophobizing treatment, there are given a method involving allowing a silylating agent (e.g., hexamethyldisilazane), a silane coupling agent, or the like to react with the inorganic fine particles 8, and a method involving mixing a silicone compound or fluorocarbon compound having a lower molecular weight than the water repellent resin 4 with the inorganic fine particles 8 to adsorb the compound onto their surfaces. In the latter method, after the mixing, heating of the mixture to 100° C. or more can allow the hydrophobization to proceed reliably. The former method is preferred because highly stable oil repellency is obtained. The latter method has an advantage in that an inexpensive raw material can be utilized. The hydrophobizing treatment of the inorganic fine particles 8 may be performed while the inorganic fine particles 8 are in a powdery state, or may be performed by adding the above-mentioned silylating agent or the like while the inorganic fine particles 8 are in a state of being dispersed in the coating composition for undercoat layer formation. In the case of the latter, after the application of the coating composition for undercoat layer formation, heating of the applied film by hot air blowing or infrared irradiation can allow the hydrophobization to proceed reliably.

The average particle diameter of the primary particles of the inorganic fine particles 8 is 2 nm or more and 20 nm or less, preferably 5 nm or more and 15 nm or less. When the average particle diameter of the primary particles of the inorganic fine particles 8 is less than 2 nm, the preparation of the coating composition for topcoat layer formation becomes difficult, and moreover, the water repellency of the water repellent coating film becomes insufficient. Meanwhile, when the average particle diameter of the primary particles of the inorganic fine particles 8 is more than 20 nm, the water repellency of the water repellent coating film becomes insufficient, and moreover, the water repellency is liable to be lost when friction is repeated. Herein, the average particle diameter of the inorganic fine particles 8 refers to a value measured with a laser diffraction particle size distribution measurement apparatus.

Examples of the water repellent resin 4 include a fluororesin, a silicone resin, and a resin obtained by mixing an acrylic resin, a urethane resin, an epoxy resin, or the like with a fluorine-based additive or the like to form a water repellent surface. Of those, a fluororesin and a silicone resin are preferred because of being excellent in water repellency.

A mass ratio between the inorganic fine particles 8 and the water repellent resin 4 in the topcoat layer 6 falls within preferably the range of from 40:60 to 95:5, more preferably the range of from 50:50 to 90:10. When the volume ratio of the inorganic fine particles 8 is excessively large, the topcoat layer 6 becomes brittle to reduce the wear resistance in some cases. Meanwhile, when the volume ratio of the water repellent resin 4 is excessively large, sufficient water repellency is not obtained in some cases.

The topcoat layer 6 may be formed by applying, onto the undercoat layer 5, a coating composition for topcoat layer formation containing the inorganic fine particles 8, the water repellent resin 4, and a solvent capable of dissolving the water repellent resin. The total amount of the inorganic fine particles 8 and the water repellent resin 4 is preferably 0.3 mass % or more and 70 mass % or less, more preferably 0.5 mass % or more and 50 mass % or less with respect to the coating composition for topcoat layer formation. When the total amount of the inorganic fine particles 8 and the water repellent resin 4 is less than 0.3 mass %, the topcoat layer 6 becomes thin and sufficient water repellency is not obtained in some cases. Meanwhile, when the total amount of the inorganic fine particles 8 and the water repellent resin 4 is more than 70 mass %, a film having many cracks is liable to be formed, and the topcoat layer 6 is liable to be peeled off in some cases. The preparation of the coating composition for topcoat layer formation is preferably performed using a submerged disperser, such as a homogenizer, a dissolver, or a high-pressure dispersing apparatus, so that the inorganic fine particles 8 may not remain as large aggregates. In addition, as the solvent, a solvent having a boiling point and viscosity appropriate for an application method only needs to be appropriately selected from solvents each capable of dissolving the water repellent resin.

The application of the coating composition for topcoat layer formation may be performed by spray application, brush application, roller brush application, or the like. The thickness of the topcoat layer 6 is preferably adjusted so that the amount of the water repellent resin 4 after drying per 100 cm$^2$ may be 0.03 g or more and 1.2 g or less. When the amount of the water repellent resin 4 is less than 0.03 g, the undercoat layer 5 is exposed and sufficient water repellency is not obtained in some cases. Meanwhile, when the amount of the water repellent resin 4 is more than 1.2 g, the water repellency is liable to be reduced by friction or the topcoat layer 6 is liable to be peeled off by friction in some cases.

Examples of the base material 1 on which the water repellent coating film is to be formed may include various parts in a product required to have water repellent performance. Examples of the product required to have water repellent performance include a heat exchanger for an outdoor unit of an air conditioner, an elevator, a refrigerator, a solar cell, and a radome. As a material for the base material 1, for example, there are given: plastics, such as unsaturated polyester, polyethylene, cross-linked polyethylene, polyvinyl chloride, polyimide, polypropylene, polystyrene, an ABS resin, an AS resin, a fluororesin, and a silicone resin; metals, such as aluminum or stainless steel; glass; and porcelain.

Second Embodiment

Figure 3:
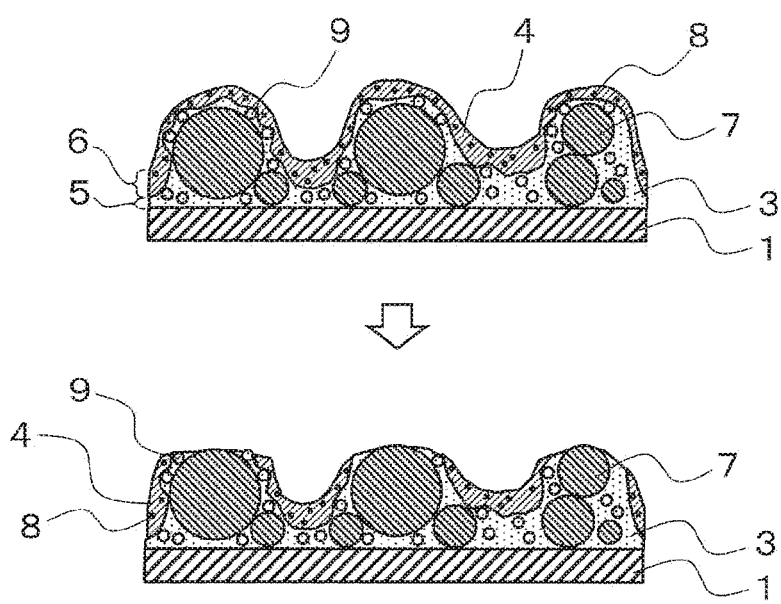
FIG. 3 is a schematic cross-sectional view for illustrating states of a water repellent coating film according to a second embodiment of the present invention before and after wear.

FIG. 3 is a schematic cross-sectional view for illustrating states of a water repellent coating film according to a second embodiment of the present invention before and after wear.

The water repellent coating film according to the second embodiment differs from the first embodiment in that the undercoat layer 5 further contains porous particles 9 having an average particle diameter that is 1 μm or more and 15 μm or less and smaller than the average particle diameter of the spherical particles 7. When the undercoat layer 5 contains the porous particles 9 having the specific average particle diameter, fine unevenness is formed on the surface of the undercoat layer 5. With this, the following effect is obtained: the topcoat layer 6 becomes less liable to be peeled from the undercoat layer 5, and excellent water repellency can be maintained even when friction is repeated. The reason for this is considered to be as follows: the fine unevenness formed on the surface of the undercoat layer 5 increases a contact area with the topcoat layer 6 and provides an anchoring effect.

Examples of the porous particles 9 include: silica gel; precipitated silica; calcium silicate particles, such as xonotlite and tobermorite; alumina hydrate particles, such as boehmite; and products obtained by making lime-based particles, such as quicklime and slaked lime, porous. Those porous particles 9 may be used alone or in combination thereof. Of those, silica gel and precipitated silica are preferred because of having moderate strength and showing satisfactory dispersibility in the undercoat layer 5. In addition, the surfaces of the porous particles 9 may be hydrophobized by a method similar to that for the hydrophobizing treatment of the inorganic fine particles described above. When the surfaces of the porous particles 9 are hydrophobized, the water repellency is even less liable to be reduced even when the surface of the water repellent coating film is worn by friction or the like. In addition, it is also preferred to mix the porous particles 9 with a solution of a fluororesin or a silicone resin and dry the mixture, to thereby impregnate the inside of each of the porous particles 9 with a fluororesin or a silicone resin. When the porous particles 9 impregnated with the fluororesin or the silicone resin are used, the water repellency is even less liable to be reduced even when the surfaces of the porous particles 9 are worn by friction or the like.

The average particle diameter of the porous particles 9 is 1 μm or more and 15 μm or less and smaller than the average particle diameter of the spherical particles 7. When the porous particles 9 having an average particle diameter smaller than the average particle diameter of the spherical particles 7 are used, unevenness smaller than the unevenness to be formed by the spherical particles 7 can be formed. The porous particles 9 are porous, and hence are easily crushed at the time of wear, and do not affect the wear-suppressing effect of the spherical particles 7 and a characteristic of securing flatness of a worn surface. In addition, the water repellent resin 4 is likely to adhere to the crushed surfaces of the porous particles 9, and thus, high water repellency is maintained. When the average particle diameter of the porous particles 9 is less than 1 μm, the worn surfaces are liable to become hydrophilic in some cases. Meanwhile, when the average particle diameter of the porous particles 9 is more than 15 μm, large hydrophilic surfaces are generated at the time of crushing of the porous particles 9 to make the adhesion of water liable to occur in some cases. Herein, the average particle diameter of the porous particles 9 refers to a value measured with a laser diffraction particle size distribution measurement apparatus.

The content of the porous particles 9 in the undercoat layer 5 is preferably 5 mass % or more and 80 mass % or less with respect to the content of the spherical particles 7. When the content of the porous particles 9 is less than 5 mass %, the fine unevenness-forming effect is small, and the peeling-suppressing effect on the topcoat layer 6 is not obtained in some cases. Meanwhile, when the content of the porous particles 9 is more than 80 mass %, the worn surfaces are liable to become hydrophilic in some cases.

The total amount of the spherical particles 7 and the porous particles 9 is preferably 10 mass % or more and 95 mass % or less, more preferably 20 mass % or more and 80 mass % or less with respect to the underlying resin 3. When the total amount of the spherical particles 7 and the porous particles 9 is less than 10 mass %, unevenness formed by the porous particles is not sufficiently obtained in some cases. Meanwhile, when the total amount of the spherical particles 7 and the porous particles 9 is more than 95 mass %, the application becomes difficult or strength as the undercoat layer 5 is not obtained in some cases.

The undercoat layer 5 in the water repellent coating film according to the second embodiment may be formed by applying, to the base material 1, a coating composition for undercoat layer formation containing the underlying resin 3, the spherical particles 7, the porous particles 9, and a solvent capable of dissolving or emulsifying the underlying resin. The total amount of the underlying resin 3, the spherical particles 7, and the porous particles 9 is preferably 3 mass % or more and 50 mass % or less with respect to the coating composition for undercoat layer formation. When the total amount of the underlying resin 3, the spherical particles 7, and the porous particles 9 is less than 3 mass %, the spherical particles 7 are liable to settle out to reduce the handleability of the coating composition, and moreover, the spherical particles 7 cannot be stably fixed in the undercoat layer 5 in some cases. Meanwhile, when the total amount of the underlying resin 3, the spherical particles 7, and the porous particles 9 is more than 50 mass %, it is difficult to uniformly form the undercoat layer 5 in some cases. A crosslinking agent may be added to the coating composition for undercoat layer formation in order to improve the strength of the underlying resin 3. In addition, a known additive may be added to the coating composition for undercoat layer formation in order to improve applicability or improve the water repellency of the undercoat layer 5.

The application method for the coating composition for undercoat layer formation, the thickness of the undercoat layer 5, the configuration of the topcoat layer 6, the application method for the coating composition for topcoat layer formation, and the thickness of the topcoat layer 6 are the same as in the first embodiment.

Third Embodiment

Figure 4:
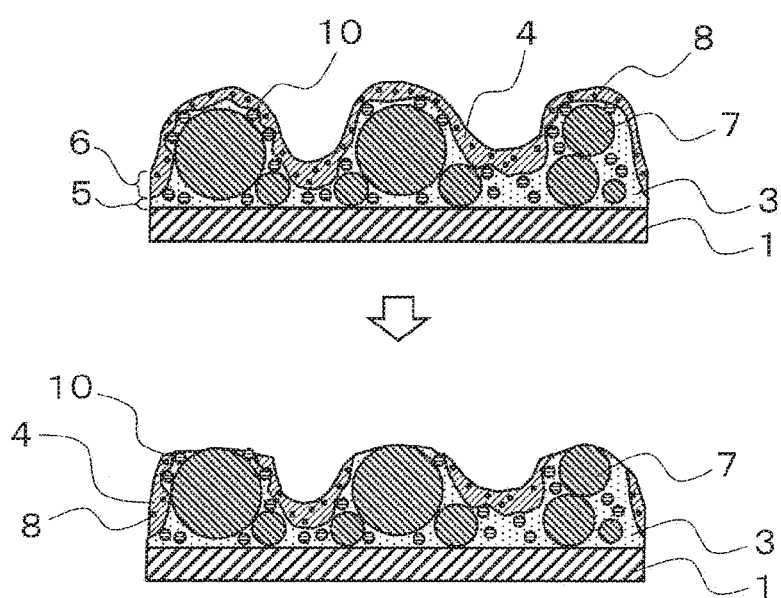
FIG. 4 is a schematic cross-sectional view for illustrating states of a water repellent coating film according to a third embodiment of the present invention before and after wear.

FIG. 4 is a schematic cross-sectional view for illustrating states of a water repellent coating film according to a third embodiment of the present invention before and after wear. The water repellent coating film according to the third embodiment differs from the first embodiment in that the undercoat layer 5 further contains fluororesin particles 10 having an average particle diameter that is 0.05 μm or more and 15 μm or less and smaller than the average particle diameter of the spherical particles 7. When the undercoat layer 5 contains the fluororesin particles 10 having the specific average particle diameter, the following effect is obtained as in the description of the second embodiment: fine unevenness is formed on the surface of the undercoat layer 5, and hence the topcoat layer 6 becomes less liable to be peeled from the undercoat layer 5.

The fluororesin particles 10 have properties of being soft and easily stretched by friction. When the undercoat layer 5 is worn and the fluororesin particles 10 start to be exposed, the fluororesin is stretched over the worn surface by friction, with the result that high water repellency is imparted to the worn surface. Thus, high water repellency is imparted to the worn surface, and besides, the topcoat layer 6 remains without being peeled off except on the worn surface. Accordingly, the water repellency is even less liable to be reduced even when the surface is worn.

As a material for the fluororesin particles 10 to be used in this case, for example, there are given polytetrafluoroethylene (PTFE), a perfluoroalkoxyalkane (PFA), and a perfluoroethylenepropene copolymer (FEP).

The average particle diameter of the fluororesin particles 10 is 0.05 μm or more and 15 μm or less and smaller than the average particle diameter of the spherical particles 7. When the fluororesin particles 10 having a smaller average particle diameter than the spherical particles 7 are used, unevenness smaller than the unevenness to be formed by the spherical particles 7 can be formed. The fluororesin particles 10 are easily stretched by friction, and do not affect the wear-suppressing effect of the spherical particles 7 and a characteristic of securing flatness of the worn surface. Further, when the fluororesin is stretched over the worn surface, not only high water repellency is imparted, but also lubricity is imparted to the worn surface, and hence a suppressing effect on the progress of wear is also obtained. When the average particle diameter of the fluororesin particles 10 is less than 0.05 μm, adhesiveness between the base material 1 and the undercoat layer 5 is reduced to make the undercoat layer 5 liable to be peeled from the base material 1 in some cases. Meanwhile, when the average particle diameter of the fluororesin particles 10 is more than 15 μm, the strength of the undercoat layer 5 is reduced in some cases. Herein, the average particle diameter of the fluororesin particles 10 refers to a value measured with a laser diffraction particle diameter measurement apparatus. The fluororesin particles 10 may be such that the primary particles thereof have an average particle diameter that is 0.05 μm or more and 15 μm or less and smaller than the average particle diameter of the spherical particles 7, or may be such that the secondary particles thereof (aggregates of primary particles having an average particle diameter of from several tens of nm to several hundreds of nm) have an average particle diameter that is 0.05 μm or more and 15 μm or less and smaller than the average particle diameter of the spherical particles 7.

The content of the fluororesin particles 10 in the undercoat layer 5 is preferably 5 mass % or more and 100 mass % or less with respect to the spherical particles 7. When the content of the fluororesin particles 10 is less than 5 mass %, the fine unevenness-forming effect is small, and the peeling-suppressing effect on the topcoat layer 6 is not obtained in some cases. Meanwhile, when the content of the fluororesin particles 10 is more than 100 mass %, the undercoat layer 5 becomes soft to reduce the wear resistance in some cases.

The total amount of the spherical particles 7 and the fluororesin particles 10 is preferably 10 mass % or more and 70 mass % or less, more preferably 30 mass % or more and 60 mass % or less with respect to the underlying resin 3. When the total amount of the spherical particles 7 and the fluororesin particles 10 is less than 10 mass %, sufficient unevenness is not obtained in some cases. Meanwhile, when the total amount of the spherical particles 7 and the fluororesin particles 10 is more than 70 mass % the application becomes difficult or strength as the undercoat layer 5 is not obtained in some cases.

The undercoat layer 5 in the water repellent coating film according to the third embodiment may be formed by applying, to the base material 1, a coating composition for undercoat layer formation containing the underlying resin 3, the spherical particles 7, the fluororesin particles 10, and a solvent capable of dissolving or emulsifying the underlying resin. As a method of adding the fluororesin particles 10 to the coating composition for undercoat layer formation, for example, there are given: a method involving mixing the fluororesin particles 10 in a powdery state with the underlying resin 3, the spherical particles 7, and the solvent; and a method involving mixing a dispersion of the fluororesin particles 10 with the underlying resin 3, the spherical particles 7, and the solvent. The total amount of the underlying resin 3, the spherical particles 7, and the fluororesin particles 10 is preferably 3 mass % or more and 50 mass % or less with respect to the coating composition for undercoat layer formation. When the total amount of the underlying resin 3, the spherical particles 7, and the fluororesin particles 10 is less than 3 mass %, the spherical particles 7 are liable to settle out to reduce the handleability of the coating composition, and moreover, the spherical particles 7 cannot be stably fixed in the undercoat layer 5 in some cases. Meanwhile, when the total amount of the underlying resin 3, the spherical particles 7, and the fluororesin particles 10 is more than 50 mass %, it is difficult to uniformly form the undercoat layer 5 in some cases. A crosslinking agent may be added to the coating composition for undercoat layer formation in order to improve the strength of the underlying resin 3. In addition, a known additive may be added to the coating composition for undercoat layer formation in order to improve applicability or improve the water repellency of the undercoat layer 5.

The application method for the coating composition for undercoat layer formation, the thickness of the undercoat layer 5, the configuration of the topcoat layer 6, the application method for the coating composition for topcoat layer formation, and the thickness of the topcoat layer 6 are the same as in the first embodiment.

Fourth Embodiment

When the water repellent coating film of the present invention is formed on the surface of an insulator, its insulating characteristic can be improved. The insulator is used for fixing a conductor having a large voltage without causing a short circuit. Examples of the insulator include polyethylene, cross-linked polyethylene, polyvinyl chloride, polyimide, a rubber-like polymer, a fluororesin, such as PTFE or ETFE, a silicone resin, an inorganic material, such as glass or porcelain, and products obtained by coating with those materials.

Figure 5:
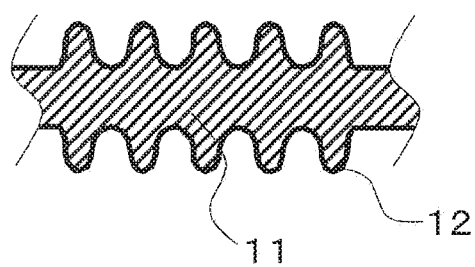
FIG. 5 is a schematic cross-sectional view of a case in which the water repellent coating film of the present invention is applied to an insulator.

FIG. 5 is a schematic cross-sectional view of a case in which the water repellent coating film of the present invention is applied to the insulator. In FIG. 5, on the surface of an insulator 11, a water repellent coating film 12 of the present invention is formed. As illustrated in FIG. 5, ribs may be formed on the external surface of the insulator 11 so that creeping discharge in which a current flows along the surface of the insulator 11 may hardly occur. When the surface of the insulator 11 is contaminated with salt, dust, or the like, the insulating property of the surface is reduced to increase a leakage current, and in association with this, an arc is generated to break insulation in some cases.

When the water repellent coating film 12 is formed on the surface of the insulator 11, the adhesion of water droplets or dust is suppressed, and contamination with salt or dust adversely affecting the insulating property can be suppressed. Not only the contamination can be suppressed, but also a suppressing effect on the deterioration of the insulating property is obtained even when the contamination occurs. A reduction in insulating property due to surface contamination manifests itself when a contaminant absorbs moisture to form a conductive film. On the water repellent coating film 12, the contaminant that has absorbed moisture cannot form a film, and assumes a spherical shape or a particulate shape. Under such state, a high insulating property can be maintained even in the presence of a contaminant.

Factors for reducing the insulating property include, in addition to the above-mentioned contamination, deterioration of the insulator 11 due to: a compound, such as nitric acid or sulfuric acid, produced as a result of discharge; ultraviolet light; or the like. In the case of the insulator 11 formed of a resin other than a fluororesin, the resin is deteriorated through long-term use, and gradually, the insulating property is also reduced. The formation of the water repellent coating film of the present invention can suppress the deterioration of the resin. The water repellent coating film 12 in this case can exhibit the effect irrespective of which of those described in the first to third embodiments is adopted. Particularly in this application, the use of the fluororesin or the silicone resin as the underlying resin provides particularly satisfactory results. Such underlying resin is hardly deteriorated and hardly causes a reduction in long-term performance of the insulator.

Fifth Embodiment

When the water repellent coating film of the present invention is used for outdoor equipment, the adhesion of water droplets or fouling can be suppressed. The water repellent coating film of the present invention has high durability also against hail, graupel, snow, rain, and the like, and hence can exhibit its effect over a long period of time.

Figure 6:
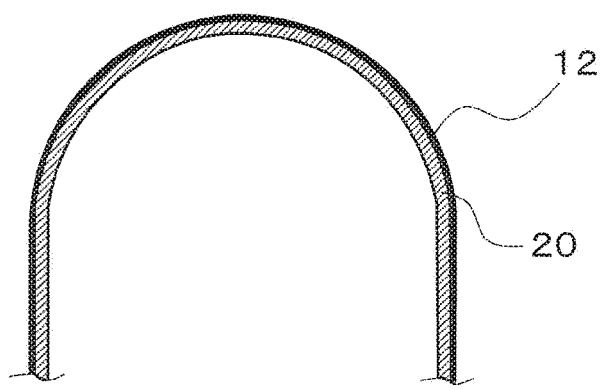
FIG. 6 is a schematic cross-sectional view of a case in which the water repellent coating film of the present invention is applied to a radome.

FIG. 6 is a schematic cross-sectional view of a case in which the water repellent coating film of the present invention is applied to a radome. In FIG. 6, on the external surface of a radome 20, the water repellent coating film 12 of the present invention is formed. The radome is often installed outdoors, and has problems of the adhesion of fouling and the deterioration of the surface. A radar using a microwave or a millimeter wave sometimes has a problem of water droplets adhering to the external surface of the radome. The formation of the water repellent coating film of the present invention can prevent those problems. The water repellent coating film 12 in this case can exhibit the effect irrespective of which of those described in the first to third embodiments is adopted.

Figure 7:
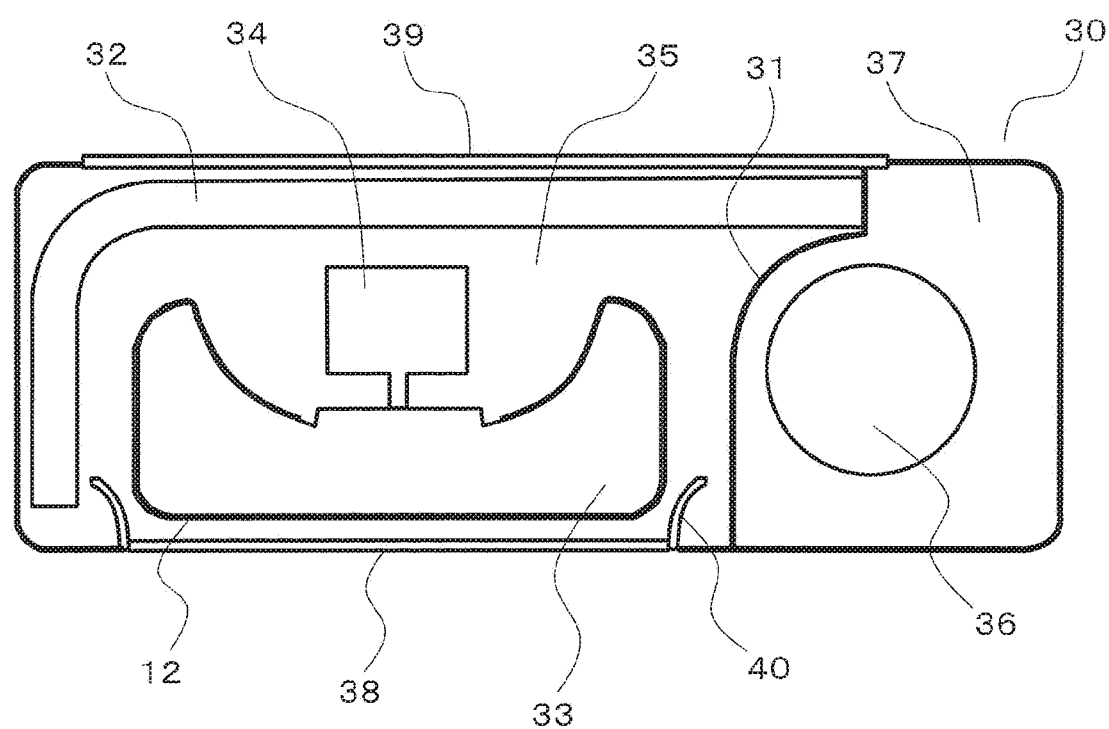
FIG. 7 is a schematic configuration view of a case in which the water repellent coating film of the present invention is applied to an outdoor unit of an air conditioner.

FIG. 7 is a schematic configuration view of a case in which the water repellent coating film of the present invention is applied to an outdoor unit of an air conditioner. In FIG. 7, the interior of an outdoor unit 30 is divided by a partition plate 31 into a heat exchanger 32, a heat exchange chamber 35 including a fan 33 and a fan motor 34, and a machine chamber 37 including a compressor 36, and the heat exchange chamber 35 is provided with an air outlet 38 and an air inlet 39. In addition, the air outlet 38 is provided with a bellmouth 40. On the surface of the fan 33, the water repellent coating film 12 of the present invention is formed. During heating, snow or the like may adhere to the fan to reduce efficiency or make continuous operation difficult. When the water repellent coating film of the present invention is formed on the surface of the fan 33, the adhesion of snow or ice can be suppressed to alleviate the problem resulting therefrom. In addition, when the water repellent coating film of the present invention is formed on the surface of the heat exchanger 32, the adhesion of snow or ice thereto can also be suppressed. When snow or ice adheres to or is peeled from the surface of the fan or the surface of the heat exchanger, a large frictional force is generated on the surface. When the water repellent coating film of the present invention is formed, an effect can be exhibited over a long period of time. The water repellent coating film 12 in this case can exhibit the effect irrespective of which of those described in the first to third embodiments is adopted.

EXAMPLES

Now, the present invention is specifically described by way of Examples and Comparative Examples. However, the present invention is by no means limited thereto.

Example 1

With the use of particles obtained by mixing spherical molten silica particles (manufactured by Denka Company Limited) with hexamethyldisilazane and then drying the mixture to hydrophobize the particles, followed by classifying the hydrophobized particles, as spherical particles (average particle diameter: 2.1 µm), and with the use of a polyurethane dispersion (ADEKA BONTIGHTER (trademark) HUX-232, manufactured by Adeka Corporation) as an underlying resin, there was prepared a coating composition for undercoat layer formation containing 5 mass % of the spherical molten silica particles and 5 mass % of the polyurethane resin. The coating composition was applied onto an aluminum plate by spray application, and then dried at 120° C. for 15 minutes to form an undercoat layer. The average thickness of the undercoat layer was measured with a microscope and found to be 1.5 µm. In addition, a volume ratio between the polyurethane resin and the spherical molten silica particles in the undercoat layer was 40:60.

Next, with the use of hydrophobic fumed silica (RX300, average particle diameter: 7 nm, manufactured by Nippon Aerosil Co., Ltd.) as inorganic fine particles, the use of a silicone resin (KR221, manufactured by Shin-Etsu Silicone) as a water repellent resin, and the use of xylene as a solvent, there was prepared a coating composition for topcoat layer formation containing 3.0 mass % of the hydrophobic fumed silica and 1.0 mass % of the silicone resin. The coating composition was applied onto the undercoat layer by spray application, and then dried at 120° C. for 5 minutes to form a topcoat layer. The application of the coating composition for topcoat layer formation was performed so that the amount of the silicone resin after drying per 100 $cm^2$ was about 0.6 g.

The evaluation of initial water repellency was performed by dropping about 5 µL of a water droplet from the tip of a needle having an inner diameter of 0.1 mm and coated with polytetrafluoroethylene (PTFE) onto the surface of the water repellent coating film, and measuring a contact angle between the water droplet and the surface with a contact angle meter (Model CX-150 manufactured by Kyowa Interface Science Co., Ltd.). The evaluation of water repellency after wear was performed by causing a polyester nonwoven fabric to be moved back and forth (50 back-and-forth movements and 100 back-and-forth movements) while being pressed at a load of 80 g/$cm^2$ against the surface of the water repellent coating film through the use of a crock meter (manufactured by Yasuda Seiki Seisakusho, Ltd.), and then measuring a water contact angle. The results of the evaluations of water repellency are shown in Table 1.

Example 2

An undercoat layer was formed in the same manner as in Example 1 except that spherical molten silica particles hydrophobized with hexamethyldisilazane and having an average particle diameter of 6.7 μm were used in place of the spherical molten silica particles hydrophobized with hexamethyldisilazane and having an average particle diameter of 2.1 μm. The average thickness of the undercoat layer was measured with a microscope and found to be 6 μm. In addition, a volume ratio between the polyurethane resin and the spherical molten silica particles in the undercoat layer was 50:50. Next, a topcoat layer was formed in the same manner as in Example 1. The results of evaluations of water repellency are shown in Table 1.

Example 3

An undercoat layer was formed in the same manner as in Example 1 except that spherical molten silica particles hydrophobized with hexamethyldisilazane and having an average particle diameter of 10.2 μm were used in place of the spherical molten silica particles hydrophobized with hexamethyldisilazane and having an average particle diameter of 2.1 μm. The average thickness of the undercoat layer was measured with a microscope and found to be 6 μm. In addition, a volume ratio between the polyurethane resin and the spherical molten silica particles in the undercoat layer was 50:50. Next, a topcoat layer was formed in the same manner as in Example 1. The results of evaluations of water repellency are shown in Table 1.

Example 4

An undercoat layer was formed in the same manner as in Example 1 except that: spherical molten silica particles hydrophobized with hexamethyldisilazane and having an average particle diameter of 10.2 μm were used in place of the spherical molten silica particles hydrophobized with hexamethyldisilazane and having an average particle diameter of 2.1 μm; and the content of the spherical molten silica particles was decreased. The average thickness of the undercoat layer was measured with a microscope and found to be 8.5 μm. In addition, a volume ratio between the polyurethane resin and the spherical molten silica particles in the undercoat layer was 70:30. Next, a topcoat layer was formed in the same manner as in Example 1. The results of evaluations of water repellency are shown in Table 1.

Example 5

An undercoat layer was formed in the same manner as in Example 1 except that spherical molten silica particles hydrophobized with hexamethyldisilazane and having an average particle diameter of 20.6 μm were used in place of the spherical molten silica particles hydrophobized with hexamethyldisilazane and having an average particle diameter of 2.1 μm. The average thickness of the undercoat layer was measured with a microscope and found to be 15 μm. In addition, a volume ratio between the polyurethane resin and the spherical molten silica particles in the undercoat layer was 50:50. Next, a topcoat layer was formed in the same manner as in Example 1. The results of evaluations of water repellency are shown in Table 1.

Example 6

An undercoat layer was formed in the same manner as in Example 1 except that spherical molten silica particles hydrophobized with hexamethyldisilazane and having an average particle diameter of 48.6 μm were used in place of the spherical molten silica particles hydrophobized with hexamethyldisilazane and having an average particle diameter of 2.1 μm. The average thickness of the undercoat layer was measured with a microscope and found to be 25 μm. In addition, a volume ratio between the polyurethane resin and the spherical molten silica particles in the undercoat layer was 50:50. Next, a topcoat layer was formed in the same manner as in Example 1. The results of evaluations of water repellency are shown in Table 1.

Example 7

An undercoat layer was formed in the same manner as in Example 1 except that particles (average particle diameter: 12.6 μm) obtained by mixing spherical molten alumina particles (manufactured by Denka Company Limited) with hexamethyldisilazane and then drying the mixture to hydrophobize the particles, followed by classifying the hydrophobized particles, were used in place of the spherical molten silica particles hydrophobized with hexamethyldisilazane and having an average particle diameter of 2.1 μm. The average thickness of the undercoat layer was measured with a microscope and found to be 18 μm. In addition, a volume ratio between the polyurethane resin and the spherical molten alumina particles in the undercoat layer was 40:60. Next, a topcoat layer was formed in the same manner as in Example 1. The results of evaluations of water repellency are shown in Table 1.

Comparative Example 1

A water repellent coating film was formed in the same manner as in Example 1 except that an undercoat layer having an average thickness of 1.2 μm was formed using a coating composition for undercoat layer formation not containing the spherical molten silica particles hydrophobized with hexamethyldisilazane and having an average particle diameter of 2.1 μm. The results of evaluations of water repellency are shown in Table 1.

Comparative Example 2

A water repellent coating film was formed in the same manner as in Example 1 except that an undercoat layer having an average thickness of 10 μm was formed using a coating composition for undercoat layer formation not containing the spherical molten silica particles hydrophobized with hexamethyldisilazane and having an average particle diameter of 2.1 μm. The results of evaluations of water repellency are shown in Table 1.

Comparative Example 3

An undercoat layer was formed in the same manner as in Example 1 except that spherical molten silica particles hydrophobized with hexamethyldisilazane and having an average particle diameter of 1.9 pim were used in place of the spherical molten silica particles hydrophobized with hexamethyldisilazane and having an average particle diameter of 2.1 μm. The average thickness of the undercoat layer was measured with a microscope and found to be 1.0 μm. Next, a topcoat layer was formed in the same manner as in Example 1. The results of evaluations of water repellency are shown in Table 1.

Comparative Example 4

An undercoat layer was formed in the same manner as in Example 1 except that spherical molten silica particles hydrophobized with hexamethyldisilazane and having an average particle diameter of 51.1 μm were used in place of the spherical molten silica particles hydrophobized with hexamethyldisilazane and having an average particle diameter of 2.1 μm. The average thickness of the undercoat layer was measured with a microscope and found to be 30 μm. Next, a topcoat layer was formed in the same manner as in Example 1. The results of evaluations of water repellency are shown in Table 1.

Comparative Example 5

An undercoat layer was formed in the same manner as in Example 1 except that crushed silica particles hydrophobized with hexamethyldisilazane and having an average particle diameter of 5 μm were used in place of the spherical molten silica particles hydrophobized with hexamethyldisilazane and having an average particle diameter of 2.1 μm. The average thickness of the undercoat layer was measured with a microscope and found to be 5 μm. Next, a topcoat layer was formed in the same manner as in Example 1. The results of evaluations of water repellency are shown in Table 1.

TABLE 1

| | Water contact angle | | |
| --- | --- | --- | --- |
| | Initial | 50 back-and-forth movements | 100 back-and-forth movements |
| Example 1 | 150° | 140°* | 130°* |
| Example 2 | 152° | 148°* | 135°* |
| Example 3 | 151° | 150° | 140°* |
| Example 4 | 150° | 150°* | 132°* |
| Example 5 | 152° | 145° | 130°* |
| Example 6 | 150° | 140° | 125°* |
| Example 7 | 152° | 150° | 145°* |
| Comparative Example 1 | 150° | 55°* | 45°* |
| Comparative Example 2 | 151° | 60°* | 42°* |
| Comparative Example 3 | 147° | 110°* | 78°* |
| Comparative Example 4 | 148° | 90°* | 70°* |
| Comparative Example 5 | 154° | 90°* | 41°* |

*Fine water droplets are liable to adhere to the surface.

It is found from Table 1 that each of the water repellent coating films of Examples 1 to 7 initially shows super water repellency (property of showing a water contact angle of 150° or more). It is also found that each of the water repellent coating films of Examples 1 to 7 maintains a large water contact angle even after wear, and hence is hardly reduced in water repellency. Although a water contact angle close to 1500 is shown after wear, a phenomenon in which fine water droplets adhere to the surface is observed. This is presumably because the topcoat layer is locally lost to expose the undercoat layer, and water is liable to adhere to the exposed portion. It is considered that the area of the exposed portion of a water repellent coating film showing a large water contact angle is extremely small. On the other hand, it is found that each of the water repellent coating films of Comparative Examples 1 and 2, in which the undercoat layer does not contain the spherical molten silica particles, shows a sharp reduction in water contact angle after wear, and hence is markedly reduced in water repellency. It is found that the water repellent coating films of Comparative Example 3 using the spherical molten silica particles having an average particle diameter of less than 2 μm, Comparative Example 4 using the spherical molten silica particles having an average particle diameter of more than 50 μm, and Comparative Example 5 using the crushed silica particles, are also markedly reduced in water repellency after wear.

Example 8

With the use of spherical silicone resin particles having an average particle diameter of 5.6 μm (Tospearl (trademark) 2000B, manufactured by Momentive Performance Materials Japan LLC) as spherical particles, and the use of a fluororesin dispersion (LUMIFLON (trademark) FE4300, manufactured by Asahi Glass Co., Ltd.) as an underlying resin, there was prepared a coating composition for undercoat layer formation containing 3 mass % of the spherical silicone resin particles and 5 mass % of the fluororesin. The coating composition was applied onto an aluminum plate by spray application, and then dried at 120° C. for 15 minutes to form an undercoat layer. The average thickness of the undercoat layer was measured with a microscope and found to be 4 μm. In addition, a volume ratio between the fluororesin and the spherical silicone resin particles in the undercoat layer was 40:60.

Next, with the use of hydrophobic fumed silica (RX300, average particle diameter: 7 nm, manufactured by Nippon Aerosil Co., Ltd.) as inorganic fine particles, the use of a fluororesin (LUMIFLON (trademark) LF800, manufactured by Asahi Glass Co., Ltd.) as a water repellent resin, and the use of ethanol as a solvent, there was prepared a coating composition for topcoat layer formation containing 3.0 mass % of the hydrophobic fumed silica and 1.0 mass % of the fluororesin. The coating composition was applied onto the undercoat layer by spray application, and then dried at 120° C. for 5 minutes to form a topcoat layer. The application of the coating composition for topcoat layer formation was performed so that the amount of the fluororesin after drying per 100 cm² was about 0.9 g. Evaluations of water repellency were performed in the same manner as in Example 1. The results of the evaluations of water repellency are shown in Table 2.

Example 9

An undercoat layer was formed in the same manner as in Example 8 except that the content of the spherical silicone resin particles was changed to 10 mass %. The average thickness of the undercoat layer was measured with a microscope and found to be 5 μm. In addition, a volume ratio between the fluororesin and the spherical silicone resin particles in the undercoat layer was 40:60. Next, a topcoat layer was formed in the same manner as in Example 8. The results of evaluations of water repellency are shown in Table 2.

Comparative Example 6

A water repellent coating film was formed in the same manner as in Example 8 except that an undercoat layer having an average thickness of 2 μm was formed using a coating composition for undercoat layer formation not containing the spherical silicone resin particles having an average particle diameter of 5.6 μm. The results of evaluations of water repellency are shown in Table 1.

Comparative Example 7

An undercoat layer was formed in the same manner as in Example 8 except that: spherical silicone resin particles having an average particle diameter of 1.9 μm (Tospearl (trademark) 120, manufactured by Momentive Performance Materials Japan LLC) were used in place of the spherical silicone resin particles having an average particle diameter of 5.6 μm; and the content of the spherical silicone resin particles was changed to 10 mass %. The average thickness of the undercoat layer was measured with a microscope and found to be 5.5 μm. Next, a topcoat layer was formed in the same manner as in Example 8. The results of evaluations of water repellency are shown in Table 2.

TABLE 2

| | Water contact angle | | |
|---|---|---|---|
| | Initial | 50 back-and-forth movements | 100 back-and-forth movements |
| Example 8 | 154° | 149° | 140°* |
| Example 9 | 155° | 150° | 141°* |
| Comparative Example 6 | 152° | 71°* | 70°* |
| Comparative Example 7 | 154° | 110°* | 78°* |

*Fine water droplets are liable to adhere to the surface.

It is found from Table 2 that each of the water repellent coating films of Examples 8 and 9 initially shows super water repellency (property of showing a water contact angle of 1500 or more). It is also found that each of the water repellent coating films of Examples 8 and 9 maintains a large water contact angle even after wear, and hence is hardly reduced in water repellency. Although a water contact angle close to 1500 is shown after wear, a phenomenon in which fine water droplets adhere to the surface is observed. This is presumably because the topcoat layer is locally lost to expose the undercoat layer, and water is liable to adhere to the exposed portion. It is considered that the area of the exposed portion of a water repellent coating film showing a large water contact angle is extremely small. On the other hand, it is found that the water repellent coating film of Comparative Example 6, in which the undercoat layer does not contain the spherical silicone resin particles, shows a sharp reduction in water contact angle after wear, and hence is markedly reduced in water repellency. It is found that the water repellent coating film of Comparative Example 7 using the spherical silicone resin particles having an average particle diameter of less than 2 μm is also markedly reduced in water repellency after wear.

Examples 10 to 15

An undercoat layer was formed in the same manner as in Example 1 except that: spherical molten silica particles hydrophobized with hexamethyldisilazane and having an average particle diameter of 10.2 μm were used in place of the spherical molten silica particles hydrophobized with hexamethyldisilazane and having an average particle diameter of 2.1 μm; and a coating composition for undercoat layer formation having added thereto particles shown in Table 3 was used. Next, a topcoat layer was formed in the same manner as in Example 1. The results of evaluations of water repellency are shown in Table 3. In Table 3, silica gel and precipitated silica are products manufactured by Tosoh Silica Corporation, and fluororesin particles are TF9201Z manufactured by 3M Japan Limited.

TABLE 3

| | Particles added to coating composition for undercoat layer formation | | Average thickness of undercoat layer | Water contact angle | | |
|---|---|---|---|---|---|---|
| | Kind, average particle diameter | Addition amount | | Initial | 50 back-and-forth movements | 100 back-and-forth movements |
| Example 10 | Silica gel, 1.2 μm | 2 mass % | 5.5 μm | 152° | 150° | 143°* |
| Example 11 | Silica gel, 2.5 μm | 2 mass % | 5.1 μm | 151° | 151° | 146°* |
| Example 12 | Precipitated silica, 3 μm | 3 mass % | 5.2 μm | 153° | 152° | 145°* |
| Example 13 | Precipitated silica, 9.8 μm | 3 mass % | 7.2 μm | 152° | 152° | 145°* |
| Example 14 | Fluororesin particles, 6 μm | 1 mass % | 5.3 μm | 155° | 150° | 149° |
| Example 15 | Fluororesin particles, 6 μm | 4 mass % | 6.2 μm | 152° | 150° | 148° |

*Fine water droplets are liable to adhere to the surface.

It is found from Table 3 that each of the water repellent coating films of Examples 10 to 15 initially shows super water repellency (property of showing a water contact angle of 150° or more). It is also found that each of the water repellent coating films of Examples 10 to 15 maintains a larger water contact angle even after wear than the water repellent coating film of Example 3, and hence is hardly reduced in water repellency. The microscopic observation of the surface after wear was able to confirm that peeling of the water repellent resin by wear was suppressed, and found an effect of the addition of the porous particles or the fluororesin particles to the undercoat layer. In particular, each of the water repellent coating films of Examples 14 and 15, in which the undercoat layer contained the fluororesin particles, not only maintained excellent water repellency even after the 100 back-and-forth movements, but also suppressed the phenomenon in which fine water droplets became liable to adhere to the surface. This is presumably because the surface to be exposed by wear has high hydrophobicity.

Examples 16 to 18

An undercoat layer was formed in the same manner as in Example 1 except that: spherical molten silica particles hydrophobized with hexamethyldisilazane and having an average particle diameter of 6.7 μm were used in place of the spherical molten silica particles hydrophobized with hexamethyldisilazane and having an average particle diameter of 2.1 μm; and a coating composition for undercoat layer formation having added thereto particles shown in Table 4 was used. Next, a topcoat layer was formed in the same manner as in Example 1. The results of evaluations of water repellency are shown in Table 4. In Table 4, silica gel and precipitated silica are products manufactured by Tosoh Silica Corporation, and fluororesin particles are TF9201Z manufactured by 3M Japan Limited.

TABLE 4

|  | Particles added to coating composition for undercoat layer formation | | Average thickness of undercoat layer | Water contact angle | | |
|---|---|---|---|---|---|---|
|  | Kind, average particle diameter | Addition amount | | Initial | 50 back-and-forth movements | 100 back-and-forth movements |
| Example 16 | Silica gel, 1.2 μm | 2 mass % | 5.4 μm | 150° | 150° | 140°* |
| Example 17 | Precipitated silica, 3 μm | 2 mass % | 5.5 μm | 153° | 152° | 140°* |
| Example 18 | Fluororesin particles, 6 μm | 3 mass % | 5.4 μm | 150° | 150° | 139° |

*Fine water droplets are liable to adhere to the surface.

It is found from Table 4 that each of the water repellent coating films of Examples 16 to 18 initially shows super water repellency (property of showing a water contact angle of 150° or more). It is also found that each of the water repellent coating films of Examples 16 to 18 maintains a larger water contact angle even after wear than the water repellent coating film of Example 2, and hence is hardly reduced in water repellency. In particular, the water repellent coating film of Example 18, in which the undercoat layer contained the fluororesin particles, not only maintained excellent water repellency even after the 100 back-and-forth movements, but also suppressed the phenomenon in which fine water droplets became liable to adhere to the surface.

Examples 19 to 21

An undercoat layer was formed in the same manner as in Example 1 except that: spherical molten silica particles hydrophobized with hexamethyldisilazane and having an average particle diameter of 20.6 μm were used in place of the spherical molten silica particles hydrophobized with hexamethyldisilazane and having an average particle diameter of 2.1 μm; and a coating composition for undercoat layer formation having added thereto particles shown in Table 5 was used. Next, a topcoat layer was formed in the same manner as in Example 1. The results of evaluations of water repellency are shown in Table 5. In Table 5, silica gel and precipitated silica are products manufactured by Tosoh Silica Corporation, and fluororesin particles are TF9201Z manufactured by 3M Japan Limited.

Example 22

With the use of spherical silicone resin particles having an average particle diameter of 5.6 μm (Tospearl (trademark) 2000B, manufactured by Momentive Performance Materials Japan LLC) as spherical particles, and the use of a fluororesin dispersion (LUMIFLON (trademark) FE4300, manufactured by Asahi Glass Co., Ltd.) as an underlying resin, there was prepared a coating composition for undercoat layer formation containing 3 mass % of the spherical silicone resin particles and 5 mass % of the fluororesin. The coating composition was applied onto an unsaturated polyester resin flat plate measuring 80 mm×100 mm by brush application, and then dried at 120° C. for 15 minutes to form an undercoat layer. The average thickness of the undercoat layer was measured with a microscope and found to be 7.5 μm. In addition, a volume ratio between the fluororesin and the spherical silicone resin particles in the undercoat layer was 40:60.

Next, with the use of hydrophobic fumed silica (RX300, average particle diameter: 7 nm, manufactured by Nippon Aerosil Co., Ltd.) as inorganic fine particles, the use of a fluororesin (LUMIFLON (trademark) LF800, manufactured by Asahi Glass Co., Ltd.) as a water repellent resin, and the use of ethanol as a solvent, there was prepared a coating composition for topcoat layer formation containing 3.0 mass % of the hydrophobic fumed silica and 1.0 mass % of the

TABLE 5

|  | Particles added to coating composition for undercoat layer formation | | Average thickness of undercoat layer | Water contact angle | | |
|---|---|---|---|---|---|---|
|  | Kind, average particle diameter | Addition amount | | Initial | 50 back-and-forth movements | 100 back-and-forth movements |
| Example 19 | Silica gel, 1.2 μm | 3 mass % | 12 μm | 152° | 150° | 141°* |
| Example 20 | Precipitated silica, 13 μm | 3 mass % | 15 μm | 150° | 152° | 142°* |
| Example 21 | Fluororesin particles, 6 μm | 2 mass % | 9.3 μm | 153° | 150° | 139° |

*Fine water droplets are liable to adhere to the surface.

It is found from Table 5 that each of the water repellent coating films of Examples 19 to 21 initially shows super water repellency (property of showing a water contact angle of 150° or more). It is also found that each of the water repellent coating films of Examples 19 to 21 maintains a larger water contact angle even after wear than the water repellent coating film of Example 5, and hence is hardly reduced in water repellency. In particular, the water repellent coating film of Example 21, in which the undercoat layer contained the fluororesin particles, not only maintained excellent water repellency even after the 100 back-and-forth movements, but also suppressed the phenomenon in which fine water droplets became liable to adhere to the surface.

fluororesin. The coating composition was applied onto the undercoat layer by spray application, and then dried at 120° C. for 5 minutes to form a topcoat layer. The application of the coating composition for topcoat layer formation was performed so that the amount of the fluororesin after drying per 100 cm² was about 0.6 g.

In order to evaluate the weatherability of the water repellent coating film in an outdoor application, initial water repellency and water repellency after deterioration were evaluated. The evaluation of the initial water repellency was performed by dropping about 5 μL of a water droplet from the tip of a needle having an inner diameter of 0.1 mm and coated with polytetrafluoroethylene (PTFE) onto the surface of the water repellent coating film, and measuring a contact angle between the water droplet and the surface with a contact angle meter (Model CX-150 manufactured by Kyowa Interface Science Co., Ltd.). The evaluation of the water repellency after deterioration was performed by deteriorating the water repellent coating film for 200 hours with a sunshine weatherometer (manufactured by Suga Test Instruments Co., Ltd.), and then measuring a water contact angle. In addition, in order to evaluate durability as an insulator, an initial insulating property and an insulating property after deterioration were evaluated. The evaluation of the initial insulating property was performed by measuring a surface resistance value. The evaluation of the insulating property after deterioration was performed by measuring a surface resistance value after exposure in a saturated vapor of 1 N nitric acid at 60° C. for 6 days. The evaluation results are shown in Table 6.

Example 23

An undercoat layer was formed in the same manner as in Example 22 except that a coating composition for undercoat layer formation having added thereto 3 mass % of silica gel having an average particle diameter of 2.5 μm (manufactured by Tosoh Silica Corporation) was used. Next, a topcoat layer was formed in the same manner as in Example 22. The results of weatherability and insulating property evaluations are shown in Table 6.

Comparative Examples 8 and 9

A product obtained by omitting the formation of the undercoat layer in Example 22 was evaluated as Comparative Example 8, and an unsaturated polyester resin flat plate having formed thereon no water repellent coating film was evaluated as Comparative Example 9. The results of weatherability and insulating property evaluations are shown in Table 6.

TABLE 6

|  | Water repellency | | Insulating property | |
| --- | --- | --- | --- | --- |
|  | Initial | After deterioration | Initial | After deterioration |
| Example 22 | 154° | 147° | 1.8E+11 Ω | 1.4E+8 Ω |
| Example 23 | 152° | 150° | 2.5E+11 Ω | 8.2E+7 Ω |
| Comparative Example 8 | 154° | 75° | 3.0E+11 Ω | 2.1E+7 Ω |
| Comparative Example 9 | 85° | 43° | 7.1E+10 Ω | 2.8E+6 Ω |

In each of Examples 22 and 23, excellent water repellency is maintained even after the deterioration test, and hence excellent weatherability is obtained. In Comparative Example 8, excellent water repellency is exhibited initially, but the water repellency is lost after the deterioration test. This is because the undercoat layer was not formed, and hence the water repellent coating film was peeled off. In Example 23, as compared to Example 24, the water repellency is satisfactorily maintained after the deterioration test. By virtue of the addition of the silica gel serving as porous particles to the undercoat layer, peeling of the water repellent coating film is suppressed, and excellent weatherability is obtained.

With regard to the insulating property, in Comparative Example 9, in which the water repellent coating film is not formed, the surface resistance value after the deterioration test is significantly reduced, but in each of Examples 22 and 23, in which the water repellent coating film is formed, the reduction in surface resistance value after the deterioration test is significantly suppressed. A water contact angle after nitric acid vapor exposure was not measured, but in each of Examples 22 and 23, the excellent water repellency is maintained, and a suppressing effect on a reduction in insulating property due to a cause other than surface deterioration, such as wetting with water, is also maintained.

EXPLANATION ON NUMERALS 1 base material, 2 amorphous particle, 3 underlying resin, 4 water repellent resin, 5 undercoat layer, 6 topcoat layer, 7 spherical particle, 8 inorganic fine particle, 9 porous particle, 10 fluororesin particle, 11 insulator, 12 water repellent coating film, 20 radome, 30 outdoor unit, 31 partition plate, 32 heat exchanger, 33 fan, 34 fan motor, 35 heat exchange chamber, 36 compressor, 37 machine chamber, 38 air outlet, 39 air inlet, 40 bellmouth

The invention claimed is:
1. A water repellent coating film, comprising:
an undercoat layer formed on a surface of a base material and including:
at least one type of spherical particles having an average particle diameter of 2 μm to 50 μm and selected from the group consisting of spherical molten silica particles, spherical molten alumina particles, and spherical silicone resin particles;
porous particles having an average particle diameter of 1 μm to 15 μm and smaller than the average particle diameter of the spherical particles; and
an underlying resin; and
a topcoat layer formed on the undercoat layer and including:
inorganic fine particles having an average particle diameter of 2 nm to 20 nm; and
a water repellent resin,
wherein a content of the porous particles in the undercoat layer is 5 mass % or more and 80 mass % or less with respect to a content of the spherical particles.
2. The water repellent coating film according to claim 1, wherein the underlying resin is a polyurethane resin or a fluororesin.
3. The water repellent coating film according to claim 2, wherein the water repellent resin is a fluororesin or a silicone resin.
4. The water repellent coating film according to claim 1, wherein the water repellent resin is a fluororesin or a silicone resin.
5. A product, comprising:
a base material; and
the water repellent coating film of claim 1 formed on a surface of the base material.

* * * * *